(12) United States Patent
Koga et al.

(10) Patent No.: US 6,990,803 B2
(45) Date of Patent: Jan. 31, 2006

(54) EXHAUST GAS PROCESSING DEVICE AND METHOD FOR DIESEL ENGINE

(75) Inventors: Toshimasa Koga, Yokohama (JP);
Junichi Kawashima, Yokosuka (JP);
Naoya Tsutsumoto, Yokohama (JP);
Makoto Otake, Yokohama (JP);
Terunori Kondou, Yokohama (JP);
Takao Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 125 days.

(21) Appl. No.: 10/815,848

(22) Filed: Apr. 2, 2004

(65) Prior Publication Data

US 2004/0194453 A1    Oct. 7, 2004

(30) Foreign Application Priority Data

Apr. 2, 2003 (JP) .............................. 2003-099207

(51) Int. Cl.
*F01N 3/00* (2006.01)
(52) U.S. Cl. ........................ 60/295; 60/274; 60/297; 60/311
(58) Field of Classification Search ............... 60/274, 60/295, 297, 311
See application file for complete search history.

(56) References Cited

U.S. PATENT DOCUMENTS

| 4,597,262 A | * | 7/1986 | Retallick ..................... 60/274 |
| 4,835,964 A | * | 6/1989 | Kume et al. .................. 60/285 |
| 6,574,956 B1 | * | 6/2003 | Moraal et al. ................ 60/295 |
| 6,622,480 B2 | * | 9/2003 | Tashiro et al. ............... 60/295 |
| 6,829,890 B2 | * | 12/2004 | Gui et al. ..................... 60/295 |
| 2003/0182936 A1 | * | 10/2003 | Kitahara ...................... 60/295 |

FOREIGN PATENT DOCUMENTS

JP        2001-280118 A       10/2001

* cited by examiner

*Primary Examiner*—Thomas Denion
*Assistant Examiner*—Diem Tran
(74) *Attorney, Agent, or Firm*—Foley & Lardner LLP (57) ABSTRACT

A controller (31) determines whether, during previous regeneration processing of a filter (41), the previous regeneration processing was interrupted or the previous regeneration processing was completed without interruption. An amount of DPM trapped in the filter (41) is estimated on the basis of a pressure loss in the filter (41) during running following uninterrupted completion of the previous regeneration processing in the previous regeneration processing of the filter (41), whereas the amount of DPM trapped in the filter (41) is estimated on the basis of an amount of discharged DPM during running following an interruption in the previous regeneration processing in the course of the previous regeneration processing of the filter (41).

9 Claims, 7 Drawing Sheets

FIG. 1

DPM DISTRIBUTION FOLLOWING COMPLETE REGENERATION

FIG. 2A

DPM DISTRIBUTION FOLLOWING INTERRUPTED REGENERATION

EXHAUST GAS PROCESSING DEVICE AND METHOD FOR DIESEL ENGINE

TECHNICAL FIELD OF THE INVENTION

This invention relates to exhaust gas purification in a diesel engine.

BACKGROUND OF THE INVENTION

In JP2001-280118A, published by the Japan Patent Office in 2001, in order to process diesel particulate matter (DPM) discharged from a diesel engine, a filter for trapping DPM is disposed in an exhaust passage, and when a predetermined amount of DPM has accumulated in the filter, the temperature of the filter is raised such that the DPM trapped in the filter is burned (filter regeneration processing).

SUMMARY OF THE INVENTION

The filter must be raised to a high temperature in order to burn the DPM that is trapped in the filter. DPM begins to burn at approximately 350° C., and burns vigorously at 650° C. or more, for example. At high vehicle speeds, the temperature required for filter regeneration can be reached and the filter regenerated (natural regeneration) without the use of temperature raising means, but at low vehicle speeds, this temperature cannot be reached. Hence, in a region where natural regeneration is impossible, temperature raising means are used to raise the exhaust gas temperature.

However, the operating condition is not always suitable for attaining the temperature required for filter regeneration, and thus filter regeneration is interrupted when the operating condition makes a sudden shift from a high vehicle speed condition to a low vehicle speed condition after regeneration processing has begun, leaving unburned DPM inside the filter. This is due to the fact that in an operating condition such as a low vehicle speed condition, in which the exhaust gas temperature is low, the filter temperature cannot be raised to the temperature required for filter regeneration even when temperature raising means are used, and hence the DPM cannot be burned continuously.

Figure 2A:
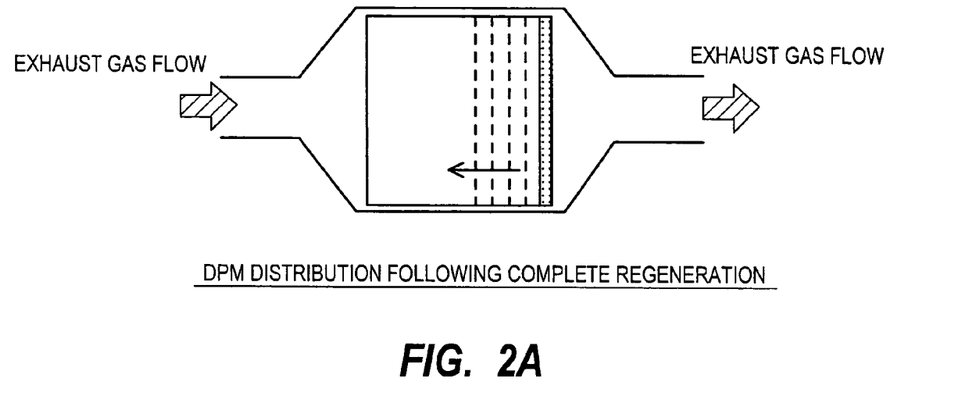
FIGS. 2A and 2B show DPM distribution inside a filter, FIG. 2A showing DPM distribution following complete regeneration, and FIG. 2B showing DPM distribution following interrupted regeneration.
Figure 2B:
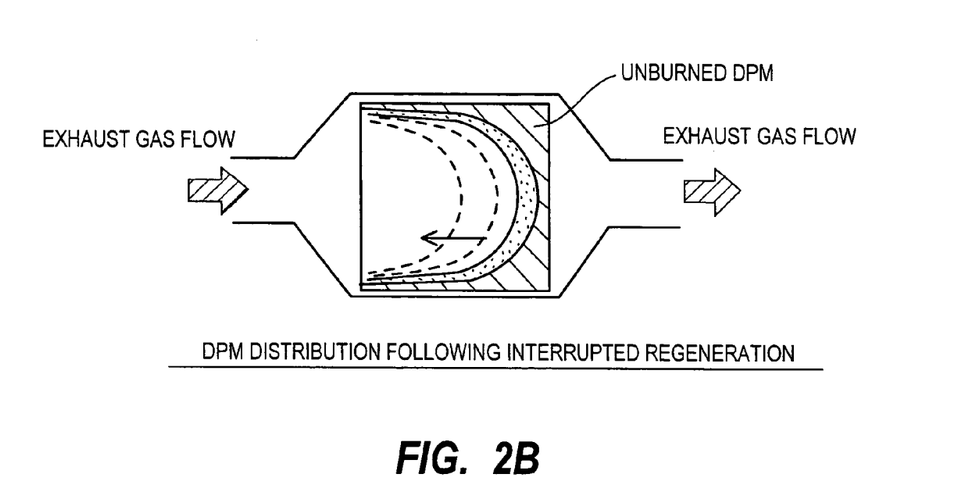

FIGS. 2A, 2B show DPM distribution inside a filter. As shown in FIG. 2B, the DPM is distributed unevenly when regeneration processing of the filter is interrupted. This is due to the fact that in a filter formed in cylindrical form and connected in an axial center position to an exhaust passage that is narrower than the outer dimension of the filter, a large temperature distribution occurs in the diametrical direction, whereby the temperature is highest in the axial center position and decreases toward the outer periphery, and thus the amount of unburned DPM increases toward the outer periphery of the filter. On the other hand, when complete regeneration processing, in which the DPM trapped in the filter is burned in its entirety, is performed without interruption, the DPM burns and dissipates uniformly up to the outer periphery of the filter as shown in FIG. 2A, and thus the DPM is not distributed unevenly.

Other devices exist in which a pressure loss $\Delta P$ in the filter during normal running is detected, and a determination is made as to whether or not a filter regeneration timing has been reached by comparing the detected filter pressure loss with a threshold. As the amount of DPM trapped in the filter increases, the filter temperature required for burning the DPM rises (see FIG. 3), and hence a critical mass for the amount of DPM trapped in the filter is determined from the maximum allowable temperature of the filter, and the threshold is determined as the pressure loss when the trapped DPM amount reaches this critical mass.

According to this determination method, however, when the DPM is distributed unevenly due to an interruption in regeneration processing such as that described above, the trapped DPM amount is estimated to be lower than the actual amount during normal running, and as a result it is determined that the regeneration timing has been reached when the trapped DPM amount has already exceeded the critical mass. As a result, regeneration processing begins and the filter temperature rises above the maximum allowable temperature of the filter, leading to possible damage to the durability of the filter.

Figure 4:
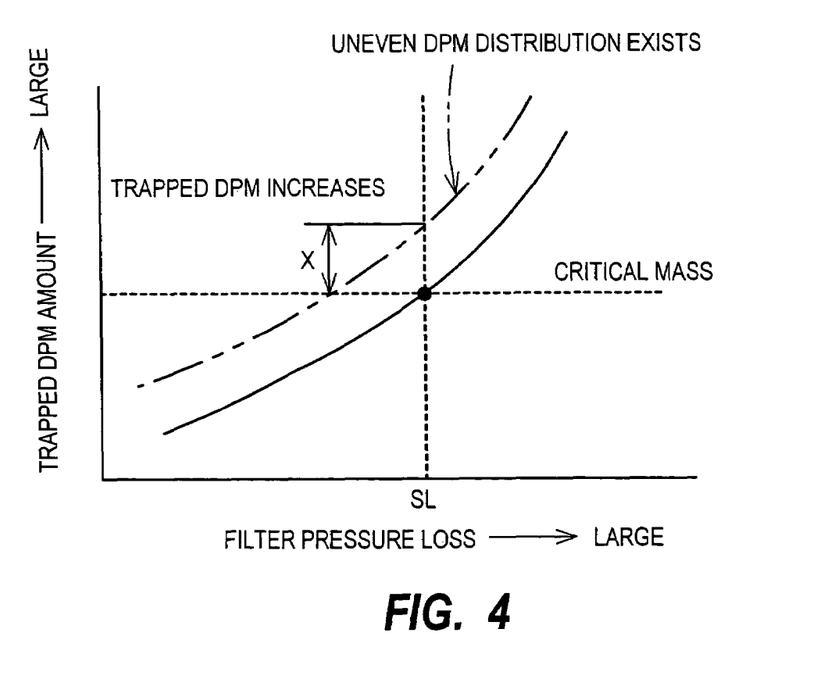
FIG. 4 is a characteristic diagram showing a relationship between pressure loss in the filter and the trapped DPM amount.

To describe this further with reference to FIG. 4, FIG. 4 shows the characteristic of the trapped DPM amount in relation to the pressure loss $\Delta P$ in the filter. As shown by the solid line, DPM is gradually trapped during normal running following the uninterrupted completion of the previous complete regeneration processing of the filter. Hence during normal running, the point in time at which the filter pressure loss $\Delta P$ reaches a threshold SL corresponding to the critical mass of the trapped DPM amount is determined as the timing of filter regeneration. However, during normal running following an interruption in the previous complete regeneration processing, uneven distribution of the DPM inside the filter causes the characteristic of the trapped DPM to move upward from the solid line to the broken line. If filter generation is performed after the filter pressure loss $\Delta P$ reaches the threshold SL in this case, an amount X from the broken line to the solid line is trapped in excess, and the filter temperature during filter regeneration processing rises in excess correspondingly.

It is therefore an object of this invention to ensure that the estimation precision of an amount of trapped DPM during normal running does not deteriorate following an interruption in the previous filter regeneration processing, and hence to ensure that the filter temperature during current filter regeneration processing does not exceed a maximum allowable temperature.

In order to achieve above object, this invention provides an exhaust gas processing device of a diesel engine, comprising a filter provided in an exhaust passage of the engine, which traps diesel particulate matter (DPM) in the exhaust gas; and a controller configured to determine whether, during previous regeneration processing of the filter, the previous regeneration processing was interrupted or whether the previous regeneration processing was completed without interruption; and estimate a trapped DPM amount in the filter on the basis of a pressure loss in the filter during running following uninterrupted completion of the previous regeneration processing in the previous regeneration processing of the filter, and estimate the trapped DPM amount in the filter on the basis of a discharged DPM amount during running following an interruption in the previous regeneration processing in the course of the previous regeneration processing of the filter.

According to an aspect of this invention, this invention provides an exhaust gas processing method for a diesel engine comprising in an exhaust passage a filter which traps DPM in the exhaust gas, comprising determining whether, during previous regeneration processing of the filter, the previous regeneration processing was interrupted or whether the previous regeneration processing was completed without interruption; and estimating a trapped DPM amount in the filter on the basis of a pressure loss in the filter during running following uninterrupted completion of the previous regeneration processing in the previous regeneration processing of the filter, and estimating the trapped DPM amount in the filter on the basis of a discharged DPM amount during running following an interruption in the previous regeneration processing in the course of the previous regeneration processing of the filter.

The details as well as other features and advantages of this invention are set forth in the remainder of the specification and are shown in the accompanying drawings.

DESCRIPTION OF THE PREFERRED EMBODIMENTS

Figure 1:
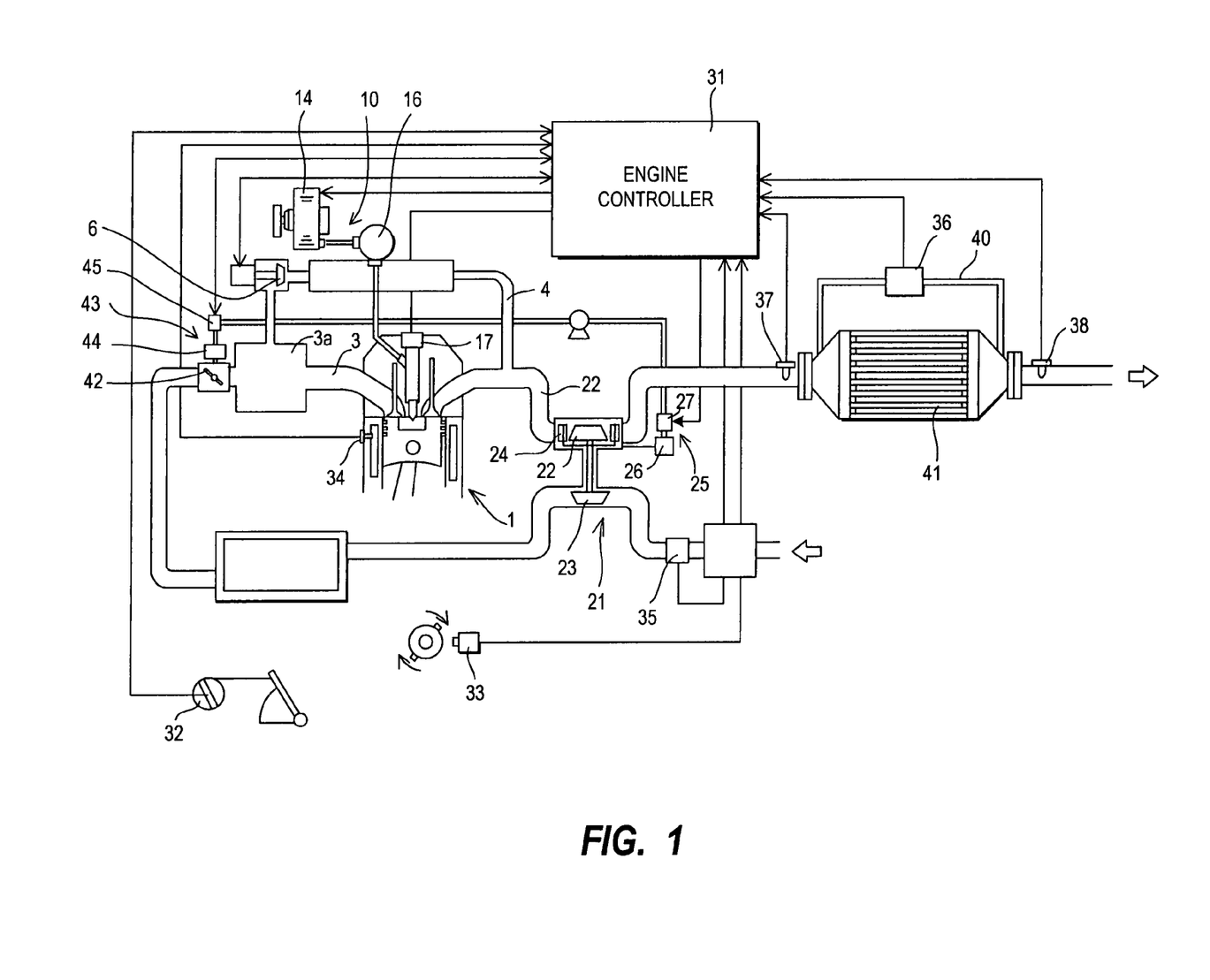
FIG. 1 is a schematic diagram of a diesel engine comprising an exhaust gas processing device according to this invention.

Referring to FIG. 1 of the drawings, a diesel engine 1 comprises a diaphragm EGR (exhaust gas recirculation) valve 6, which moves in accordance with control pressure from a pressure control valve not shown in the drawing, provided in an EGR passage 4 which connects an exhaust passage 2 to a collector 3a of an intake passage 3. The pressure control valve is driven by a duty control signal from an engine controller 31, and a predetermined EGR rate corresponding to the operating condition is obtained as a result.

The engine 1 comprises a common rail fuel injection device 10. The fuel injection device 10 is constituted mainly by a fuel tank (not shown in the drawing), a supply pump 14, a common rail (pressure accumulation chamber) 16, and a nozzle 17 provided in each cylinder. Fuel that has been pressurized by the supply pump 14 is first accumulated in the pressure accumulation chamber 16, and then the high-pressure fuel in the pressure accumulation chamber 16 is distributed to the nozzle 17 in each cylinder.

The nozzle 17 (fuel injection valve) is constituted by a needle valve, a nozzle chamber, a fuel supply passage into the nozzle chamber, a retainer, a hydraulic piston, a return spring, and so on. A three-way valve (electromagnetic valve) not shown in the drawing is provided at a point on the fuel supply passage to the hydraulic piston. When the three-way valve is OFF, the needle valve is in a sitting condition, but when the three-way valve is ON, the needle valve rises such that fuel is injected from an injection hole at the tip end of the nozzle. In other words, the start timing of fuel injection is adjusted according to the timing at which the three-way valve is switched from OFF to ON, and the fuel injection amount is adjusted according to the length of the ON period. If the pressure in the pressure accumulation chamber 16 is constant, then the fuel injection amount increases as the ON period lengthens.

A variable capacity turbocharger 21 is provided on the exhaust passage 2 downstream of the opening portion of the EGR passage 4. In the variable capacity turbocharger 21, a turbine 22 which converts the thermal energy of exhaust gas into rotational energy is coaxially coupled to a compressor 23 which compresses intake air. A variable noble 24 driven by an actuator 25 is provided at the scroll inlet of the turbine 22. To obtain a predetermined boost pressure from a low rotation speed region, the variable nozzle 24 is controlled by the engine controller 31 to a nozzle opening (a tilted condition) which raises the flow speed of exhaust gas into the turbine 22 on the low rotation speed side, and to a nozzle opening (a fully open condition) which causes exhaust gas to be introduced into the turbine 22 with no resistance on the high rotation speed side.

The actuator 25 is constituted by a diaphragm actuator 26 which drives the variable nozzle 24 by moving in accordance with control pressure, and a pressure control valve 27 which adjusts the pressure control to the diaphragm actuator 26. A duty control signal is created to set the opening of the variable nozzle 24 to a target noble opening, and the duty control signal is output to the pressure control valve 27.

An intake throttle valve 42 driven by an actuator 43 is provided at the inlet to the collector 3a. The actuator 43 is constituted by a diaphragm actuator 44 which drives the intake throttle valve 42 by moving in accordance with control pressure, and a pressure control valve 45 which adjusts the control pressure to the diaphragm actuator 44. A duty control signal is created to close the intake throttle valve 42 to a target opening, and the duty control signal is output to the pressure control valve 45.

Signals from an accelerator depression amount sensor 32, a sensor 33 which detects the engine rotation speed and crank angle, a water temperature sensor 34, and an airflow meter 35 are input into the engine controller 31. On the basis of these signals, the engine controller 31 performs EGR control and boost pressure control in a coordinated manner to obtain a target EGR ratio and a target boost pressure.

A filter 41 which traps diesel particulate matter (DPM) contained in the exhaust gas is provided in the exhaust passage 2. When the amount of DPM trapped in the filter 41 reaches a predetermined value, the exhaust gas temperature is raised such that the DPM trapped in the filter 41 is removed by combustion.

In order to detect pressure loss in the filter 41 (pressure difference between the upstream and downstream of the filter 41), a differential pressure sensor 36 is provided on a differential pressure detection passage 40 which bypasses the filter 41.

A pressure loss $\Delta P$ in the filter 41 detected by the differential pressure sensor 36 is transmitted to the engine controller 31 together with a filter inlet temperature T1 from a temperature sensor 37 and a filter outlet temperature T2 from a temperature sensor 38. The engine controller 31 is constituted by one or a plurality of microprocessors, memory, an input/output interface, and so on. Complete regeneration processing, which is regeneration processing in which the trapped DPM amount in the filter 41 is burned completely, is performed by the engine controller 31 on the basis of the transmitted information.

Figure 3:
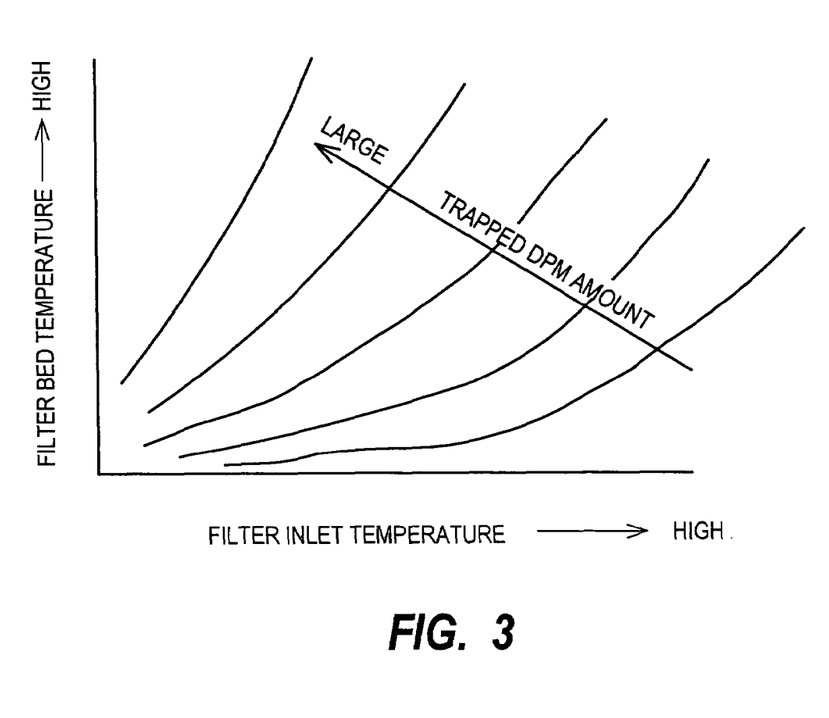
FIG. 3 is a characteristic diagram showing a relationship between the amount of trapped DPM and the temperature of a filter bed.

Basically, during normal running, the engine controller 31 determines whether the regeneration timing for the filter 41 has been reached by comparing the pressure loss ΔP of the filter 41 detected by the sensor 36 with a threshold. As shown in FIG. 3, the filter temperature for burning the DPM rises as the amount of trapped DPM in the filter 41 increases, and hence a critical mass for the trapped DPM amount in the filter 41 is determined from the maximum allowable temperature of the filter 41. The pressure loss when the trapped DPM amount is at the critical mass is determined as the threshold (see FIG. 4).

To remove the DPM trapped in the filter 41 through combustion, the filter 41 must be raised to a high temperature. DPM begins to burn at approximately 350° C., and burns vigorously at 650° C. or more, for example. At high vehicle speeds, the temperature required for complete regeneration processing of the filter 41 can be reached and the filter 41 can be regenerated without the use of temperature raising means (natural regeneration), but at low vehicle speeds, this temperature cannot be reached. Hence, in a region where natural regeneration is impossible, temperature raising means are used to raise the exhaust gas temperature.

However, complete regeneration processing is interrupted in cases such as when the operating condition makes a sudden shift from a high vehicle speed condition to a low vehicle speed condition after complete regeneration processing has begun, leaving unburned DPM inside the filter 41. The unburned condition at this time is known as uneven DPM distribution (see FIG. 2B). This is due to the fact that in an operating condition such as a low vehicle speed condition, in which the exhaust gas temperature is low, the filter temperature cannot be raised to the temperature required for complete regeneration processing of the filter 41 even when temperature raising means are used, and hence the DPM cannot be burned continuously.

During normal running following the occurrence of an uneven DPM distribution caused by an interruption in the previous complete regeneration processing, the trapped DPM amount is estimated to be lower than the actual amount, and as a result it is determined that the regeneration timing has been reached when the trapped DPM amount has already exceeded the critical mass. Thus the current complete regeneration processing begins and the temperature of the filter 41 rises above the maximum allowable temperature, leading to possible damage to the durability of the filter 41.

Hence in this embodiment:

(1) a determination is made as to whether during the previous complete regeneration processing of the filter 41, the previous complete regeneration processing was interrupted or the previous complete regeneration processing was completed without interruption;

(2) during normal running following a determination result which indicates that the previous regeneration processing was completed without interruption in the previous regeneration processing, the trapped DPM amount in the filter 41 is estimated on the basis of the pressure loss ΔP, and during normal running following a determination result indicating that the previous regeneration processing was interrupted in the course of the previous regeneration processing, the trapped DPM amount in the filter 41 is estimated on the basis of the amount of discharged DPM in the exhaust gas; and (3) during normal running following the previous complete regeneration processing, a determination is made as to whether the regeneration timing of the filter 41 has been reached on the basis of the estimated trapped DPM amount.

The content of these control processes, which are performed by the engine controller 31, will be described in detail below with reference to flowcharts.

Figure 5A:
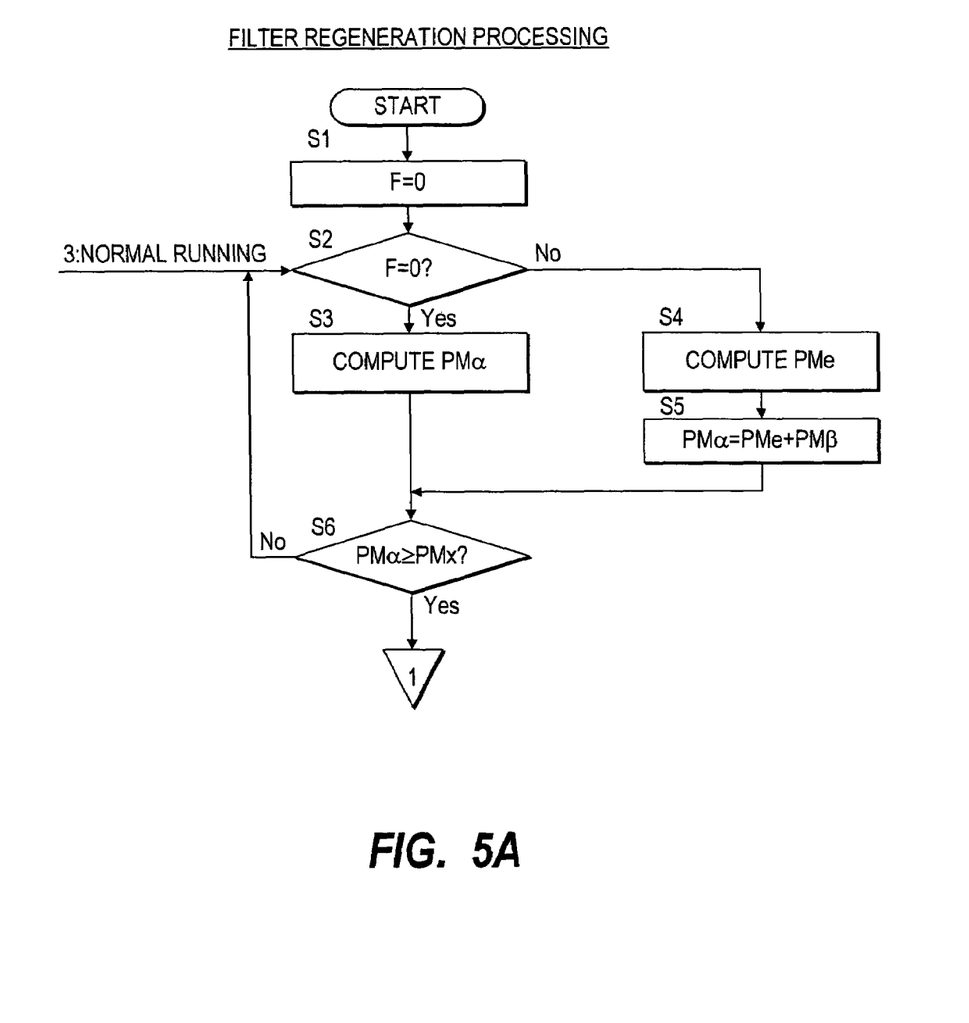
FIG. 5A is a flowchart of processing performed by an engine controller.
Figure 5B:
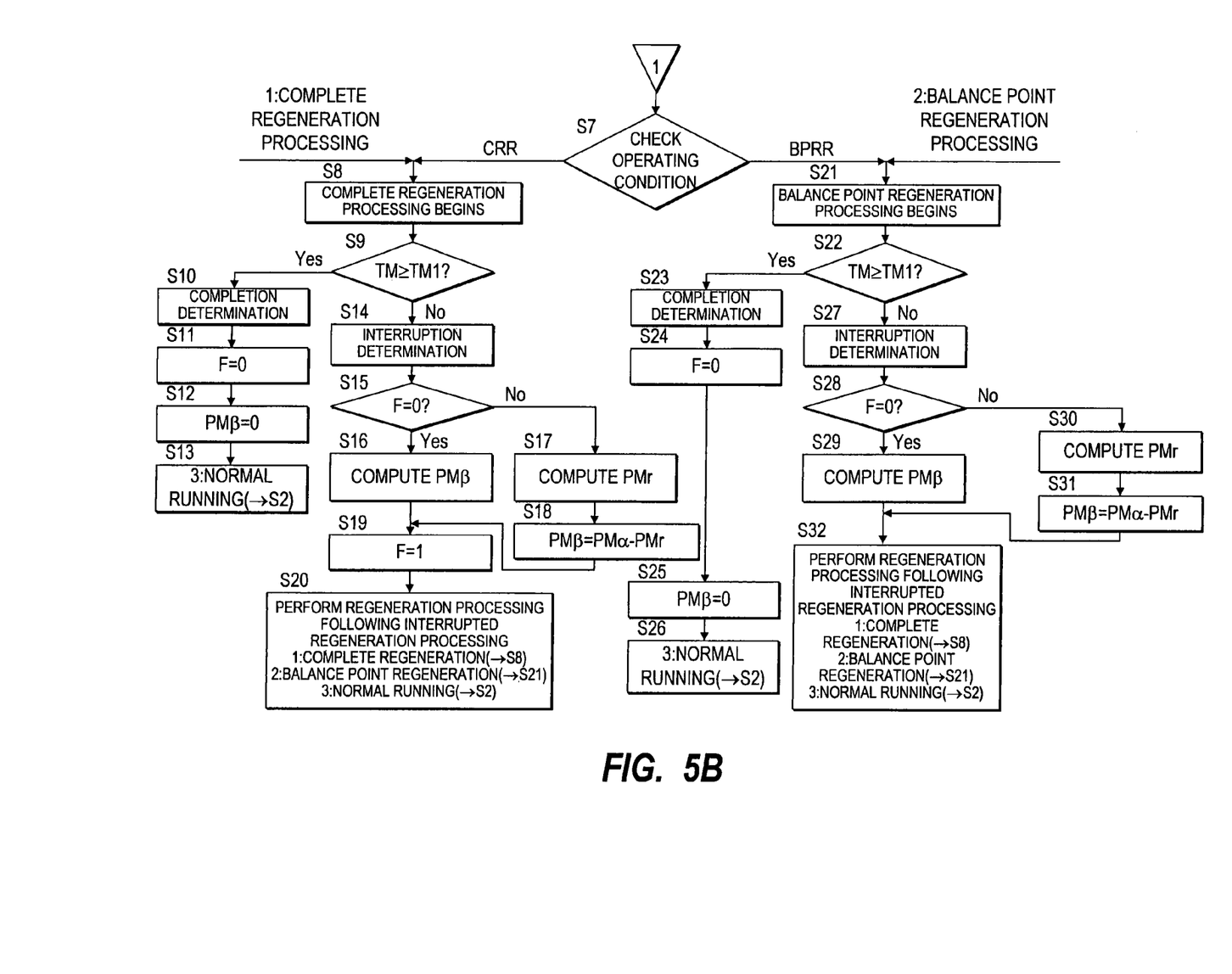
FIG. 5B is a flowchart of processing performed by the engine controller.

FIGS. 5A, 5B are processing flows performed by the engine controller 31. The flows illustrate the processing as a time series and are not implemented at fixed cycles.

The processing of the engine controller 31 is divided into processing during normal running shown in FIG. 5A, and regeneration processing of the filter 41 shown in FIG. 5B. Further, the regeneration processing of the filter 41 is divided into complete regeneration processing (steps S8–S20 in FIG. 5B), which is regeneration processing for burning the trapped DPM amount in the filter 41 completely, and balance point regeneration processing (steps S21–S32 in FIG. 5B), which is regeneration processing in which the amount of DPM entering the filter 41 and the amount of DPM burned in the filter 41 are balanced such that the trapped DPM amount in the filter 41 is maintained at a constant level.

First, processing during normal running will be described. In a step S1 at the beginning of an operation of the engine 1, an interruption flag F is set to its initial value of "0", and then, in a step S2, the interruption flag F is checked. When the interruption flag F is at "0", this indicates that either (i) the previous regeneration processing was complete regeneration processing, and this complete regeneration processing was completed without interruption, or (ii) balance point regeneration processing was performed as the previous regeneration processing. On the other hand, if the interruption flag F is at "1", this indicates that either (iii) the previous regeneration processing was complete regeneration processing, and this complete regeneration processing was interrupted, or (iv) the regeneration processing before the previous regeneration processing was complete regeneration processing that was interrupted, and balance point regeneration processing was performed as the previous regeneration processing.

When the interruption flag F is at "0", the process advances to a step S3, where a trapped DPM amount $PM\alpha$ in the filter 41 is calculated (estimated) on the basis of the pressure loss ΔP of the filter 41 detected by the sensor 36. The trapped DPM amount $PM\alpha$ is determined by referring to the map shown in FIG. 6, for example.

Figure 7:
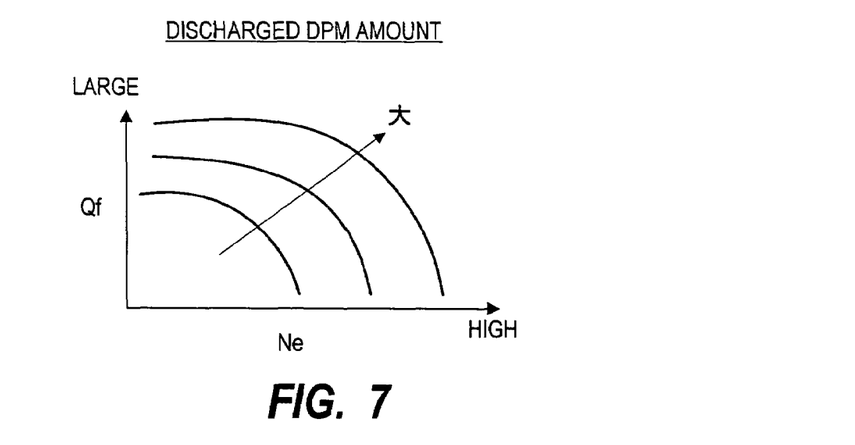
FIG. 7 is a characteristic diagram of a DPM discharge amount per predetermined time period in relation to the engine rotation speed and fuel injection amount.

When the interruption flag F is at "1", on the other hand, the process advances to steps S4, S5, where a method not based on the pressure loss ΔP of the filter 41 is used to calculate (estimate) the trapped DPM amount. This is due to the fact that if the trapped DPM amount is calculated on the basis of the pressure loss ΔP of the filter 41 when the interruption flag F is at "1", the calculation precision deteriorates. Various methods not based on the pressure loss ΔP of the filter 41 are known, and hence these known methods are used. As a simple example, the map shown in FIG. 7 is referenced on the basis of an engine rotation speed Ne and a fuel injection amount Qf in the step S4 to determine an amount of discharged DPM ΔPM per predetermined time period, whereupon this value is used to calculate a discharged DPM amount PMe during normal running from the following equation (1):

$$PMe = PMe \text{ (previous)} + \Delta PM \times T \quad (1)$$

where: PMe (previous) is the previous value of PMe; and
T is the calculation cycle.

The equation (1) is used to calculate the discharged DPM amount ΔPM per predetermined time period during normal running. As the length of the normal running period increases, the discharged DPM amount PMe during normal running rises.

In the step S5, the trapped DPM amount PMα in the filter 41 is calculated according to the following equation (2):

$$PM\alpha = PMe + PM\beta \qquad (2)$$

where PMβ is the amount of residual DPM in the filter 41.

The reason for adding the residual DPM amount PMβ in the filter 41 in the equation (2) is as follows. The process advances to the steps S4, S5 when the interruption flag F is at "1". As described above, when the interruption flag F is at "1", it signifies that either (iii) the previous regeneration processing was complete regeneration processing, and this complete regeneration processing was interrupted, or (iv) the regeneration processing before the previous regeneration processing was complete regeneration processing that was interrupted, and balance point regeneration processing was performed as the previous regeneration processing. Hence in these cases, DPM still remains in the filter 41.

In a step S6, the trapped DPM amount PMα is compared to a predetermined value PMx which serves as a reference value for determining the regeneration timing. If the trapped DPM amount PMα is less than the predetermined value PMx, the regeneration timing of the filter 41 has not been reached, and hence the process returns to the step S2 to continue normal running.

If the trapped DPM amount PMα equals or exceeds the predetermined value PMx, it is determined that the regeneration timing of the filter 41 has been reached, and the process advances from the step S6 to a step S7 in FIG. 5B.

Figure 8:
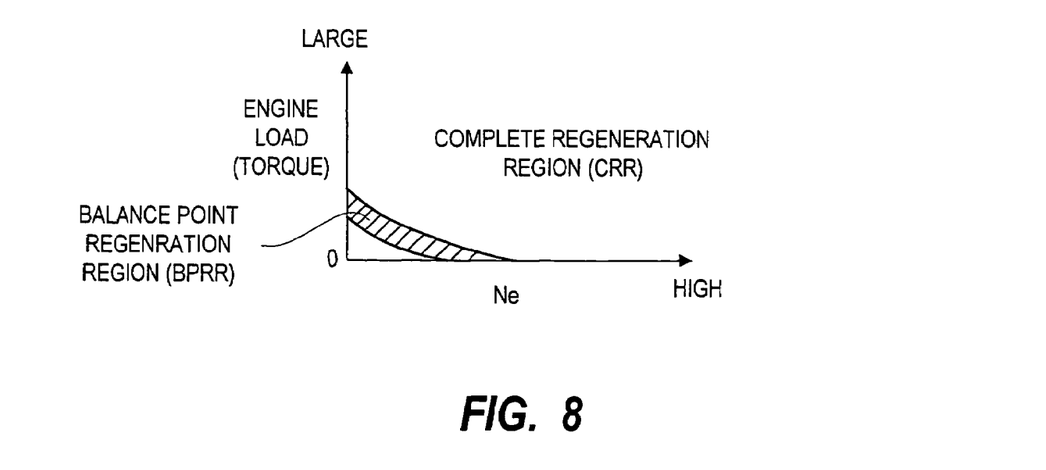
FIG. 8 is an operating region diagram.

In the step S7, a check is performed as to whether the operating condition of the engine 1 is in a complete regeneration region (CRR) shown in FIG. 8. To remove the DPM trapped in the filter 41 through combustion, the filter 41 must be raised to a high temperature (approximately 350° C. to begin DPM combustion, and at least 650° C., for example, for vigorous combustion), and hence the complete regeneration region is a region in which the temperature required for regeneration of the filter 41 has been reached such that the DPM trapped in the filter 41 can be burned completely. The complete regeneration region comprises a region in which the temperature required for regeneration of the filter 41 can be obtained without using temperature raising means (natural regeneration region), and a region in which the temperature required for regeneration of the filter 41 is not reached without the use of temperature raising means. Universally known means may be used as the temperature raising means, for example raising the temperature by retarding the main combustion timing or performing a pilot injection.

The balance point regeneration region (BPRR) is a region in which the DPM contained in the exhaust gas can be burned such that the trapped DPM amount in the filter 41 neither increases nor decreases when the temperature required for regenerating the filter 41 cannot be reached even using temperature raising means, or in other words, a region in which a balance is achieved between the amount of DPM flowing into the filter 41 and the amount of the DPM that is burned. In actuality, when approaching idling, the exhaust gas temperature becomes too low, and hence a regeneration impossible region in which even balance point regeneration processing cannot be performed also exists.

When the operating condition is in the complete regeneration region, the process advances to the complete regeneration processing shown in steps S8-S20 in FIG. 5B, and when the operating condition is in the balance point regeneration region, the process advances to the balance point regeneration processing shown in steps S21-S32 in FIG. 5B.

First, complete regeneration processing will be described. In the step S8, complete regeneration processing begins. At this processing start timing, a timer is activated. The timer is used to measure the regeneration processing period.

In a step S9, the timer value TM is compared to a predetermined value TM1. The predetermined value TM1 is set in advance to the time at which regeneration of the filter 41 ends. If the timer value TM equals or exceeds the predetermined value TM1, it is determined in a step S10 that the DPM trapped in the filter 41 has been burned completely, and thus in steps S11, S12, and S13, the interruption flag F is set to "0", the residual DPM amount PMβ in the filter 41 is set to zero, and the process returns to the processing during normal running, or in other words to the step S2 in FIG. 5A.

If, on the other hand, the operating condition shifts from the complete regeneration region to the regeneration impossible region before the timer value TM reaches the predetermined value TM1, measurement of the timer value TM is halted. At this time, the timer value TM is less than the predetermined value TM1, and hence the process advances to a step S14, where it is determined that regeneration processing has been interrupted. The interruption flag F is then checked in a step S15. If the interruption flag F is at "0" at this time, either (i) the previous regeneration processing was complete regeneration processing, and this complete regeneration processing ended without interruption, or (ii) balance point regeneration processing was performed as the previous regeneration processing.

In the case of (i), no DPM remains in the filter 41 following the previous complete regeneration processing. Any residual DPM in the filter 41 is due to the interruption of the current complete regeneration processing. Accordingly, only the residual DPM caused by the interruption in the current complete regeneration processing remains in the filter 41 at this time. Hence when F is at "0", the process advances to a step S16, where the residual DPM amount PMβ in the filter 41 is calculated on the basis of the pressure loss ΔP of the filter 41.

In the case of (ii), DPM remains in the filter 41 following the previous balance point regeneration processing, and the DPM remaining in the filter 41 due to the interruption in the current complete regeneration processing is added thereto. It should be noted, however, that an interruption in balance point regeneration processing does not cause uneven distribution of the DPM. Hence the process likewise advances to the step S16, where the residual DPM amount PMβ in the filter 41 is calculated on the basis of the pressure loss ΔP in the filter 41. The map shown in FIG. 6 may be used to calculate these residual DPM amounts PMβ.

If, on the other hand, the interruption flag F is at "1", this indicates that either (iii) the previous regeneration processing was complete regeneration processing, and this complete regeneration processing was interrupted, or (iv) the regeneration processing before the previous regeneration processing was complete regeneration processing that was interrupted, and balance point regeneration processing was performed as the previous regeneration processing.

In the case of (iii), DPM remains in the filter 41 as a result of the interruption in the previous complete regeneration processing. If the current complete regeneration processing is also interrupted, the amount of residual DPM resulting from the interruption in the current complete regeneration processing is added to the residual DPM caused by the interruption in the previous complete regeneration processing. Furthermore, in this case the DPM remains in an unevenly distributed state following interruptions in the complete regeneration processing in both cases, and hence two uneven distributions of DPM overlap. As a result, the residual DPM amount in the filter 41 cannot be calculated on the basis of the pressure loss $\Delta P$.

Likewise in the case of (iv), DPM remains in the filter 41 as a result of the interruption in the complete regeneration processing before the previous balance point regeneration processing, and this residual DPM is not removed by the previous balance point regeneration processing. If the current complete regeneration processing is also interrupted, the amount of residual DPM resulting from the interruption in the current complete regeneration processing is added to the residual DPM caused by the interruption in the complete regeneration processing before the previous balance point regeneration processing. Furthermore, in this case the DPM remains in an unevenly distributed state following interruptions in the complete regeneration processing in both cases, and hence two uneven DPM distributions overlap. As a result, the residual DPM amount in the filter 41 cannot be calculated on the basis of the pressure loss $\Delta P$.

Figure 9:
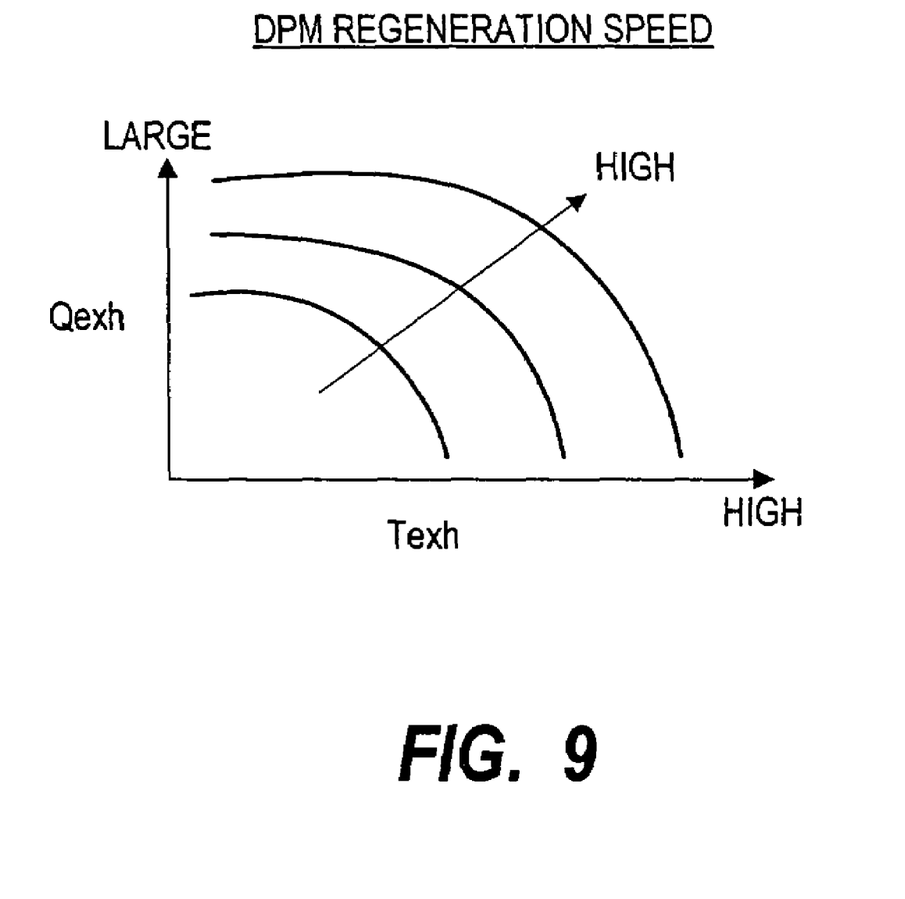
FIG. 9 is a characteristic diagram of the DPM regeneration speed in relation to exhaust gas flow and exhaust gas temperature.

Hence at this time the process advances to steps S17, S18, where the residual DPM amount is calculated using a method other than one that is based on the pressure loss $\Delta P$. More specifically, in the step S17 the residual DPM amount PM$\beta$ is calculated on the basis of the regeneration speed of the DPM trapped in the filter 41. For example, the DPM regeneration speed is determined from an exhaust gas flow Qexh and an exhaust gas temperature Texh (=the filter inlet temperature T1) by referring to the map shown in FIG. 9, and the resulting value is multiplied by the regeneration processing period (timer value TM) up to the interruption in the regeneration processing. In other words, an amount of regenerated DPM PMr up to the interruption in the regeneration processing is calculated according to the following equation (3):

$$PMr = DPM \text{ regeneration speed} \times \text{timer value} \tag{3}$$

The exhaust gas flow Qexh is determined from the engine rotation speed and fuel injection amount by referring to a predetermined map.

In the step S17, the residual DPM amount PM$\beta$ is calculated by subtracting the regenerated DPM amount PMr up to the interruption in the regeneration processing from the trapped DPM amount PM$\alpha$ (calculated in the step S3 or the steps S4, S5 in FIG. 5A).

In a step S19, the interruption flag F is set to "1" to indicate that the complete regeneration processing has been interrupted, and then the process advances to a step S20, where regeneration processing following interrupted regeneration processing is performed. Regeneration processing is divided into three types according to the operating condition. If the operating condition shifts to the complete regeneration region directly after an interruption in complete regeneration processing, the process advances to the step S8 in FIG. 5B in order to repeat complete regeneration processing. If the operating condition shifts to the balance point regeneration region directly after an interruption in complete regeneration processing, the process advances to the step S21 in FIG. 5B to perform balance point regeneration processing. If the operating condition remains in the regeneration impossible region after an interruption in complete regeneration processing, the process advances to the step S2 in FIG. 5A in order to perform normal running processing.

Next, balance point regeneration processing will be described. This processing is substantially identical to complete regeneration processing. In a step S21, balance point regeneration processing begins. At this processing start timing, a timer is activated. The timer is used to measure the balance point regeneration processing period.

In a step S22, the timer value TM is compared to a predetermined value TM1 indicating the time at which regeneration of the filter 41 ends. If the timer value equals or exceeds the predetermined value TM1, the process advances to a step S23, where it is determined that the DPM trapped in the filter 41 has been burned completely. Thus in steps S24, S25, and S26, the interruption flag F is set to "0", the residual DPM amount PM$\beta$ in the filter 41 is set to zero, and the process returns to the processing during normal running, or in other words to the step S2 in FIG. 5A.

As long as the operating condition remains in the balance point regeneration region, complete regeneration processing cannot be completed. However, the operations of the steps S23 to S26 are provided in consideration of the fact that the operating condition may shift to the complete regeneration region directly after the beginning of balance point regeneration processing.

If, on the other hand, the operating condition shifts from the balance point regeneration region to the regeneration impossible region before the timer value TM reaches the predetermined value TM1, measurement of the timer value TM is halted. At this time, the timer value TM is less than the predetermined value TM1, and hence the process advances to a step S27, where it is determined that balance point regeneration processing has been interrupted. The interruption flag F is then checked in a step S28. If the interruption flag F is at "0", this indicates that either (i') the previous regeneration processing was complete regeneration processing, and this complete regeneration processing was completed without interruption, or (ii') the regeneration processing before the previous regeneration processing was complete regeneration processing that was completed without interruption, and balance point regeneration processing was performed as the previous regeneration processing.

Figure 6:
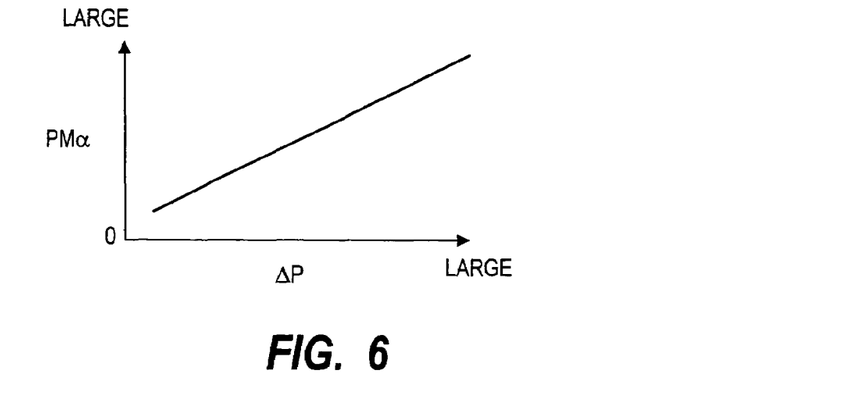
FIG. 6 is a characteristic diagram of the trapped DPM amount in relation to the filter pressure loss.

In the case of (i'), no DPM remains in the filter 41 following the previous complete regeneration processing. Any residual DPM in the filter 41 is due to the interruption of the current balance point regeneration processing. Accordingly, only the residual DPM caused by the interruption in the current balance point regeneration processing remains in the filter 41 at this time. An interruption in balance point regeneration processing does not cause uneven distribution of the DPM. Hence when the interruption flag F is at "0", the process advances to a step S29, where the residual DPM amount PM$\beta$ in the filter 41 is calculated on the basis of the pressure loss $\Delta P$ of the filter 41. In the case of (ii'), no DPM remains in the filter 41 following the complete regeneration processing before the previous balance point regeneration processing. However, DPM remains in the filter 41 following the previous balance point regeneration processing, and DPM also remains in the filter 41 as a result of the interruption in the current balance point regeneration processing. The DPM is not distributed unevenly even when balance point regeneration processing is interrupted twice in succession. Hence the process likewise advances to the step S29 at this time, where the residual DPM amount PM$\beta$ in the filter 41 is calculated on the basis of the pressure loss ΔP of the filter 41. The map shown in FIG. 6 is used to calculate these residual DPM amounts PMβ.

If, on the other hand, the interruption flag F is at "1", this indicates that either (iii') the previous regeneration processing was complete regeneration processing, and this complete regeneration processing was interrupted, or (iv') the regeneration processing before the previous regeneration processing was complete regeneration processing that was interrupted, and balance point regeneration processing was performed as the previous regeneration processing.

In the case of (iii'), DPM remains in the filter 41 as a result of the interruption in the previous complete regeneration processing. If the current balance point regeneration processing is also interrupted, the amount of residual DPM resulting from the interruption in the current balance point regeneration processing is added to the residual DPM caused by the interruption in the previous complete regeneration processing. Furthermore, in this case the DPM remains in an unevenly distributed state following the interruption in the previous complete regeneration processing. As a result, the residual DPM amount in the filter 41 cannot be calculated on the basis of the pressure loss ΔP.

Likewise in the case of (iv'), DPM remains in the filter 41 as a result of the interruption in the complete regeneration processing before the previous regeneration processing, and this residual DPM is not removed by the previous balance point regeneration processing. If the current balance point regeneration processing is also interrupted, the amount of residual DPM resulting from the interruption in the current balance point regeneration processing is added to the residual DPM caused by the interruption in the complete regeneration processing before the previous balance point regeneration processing. Furthermore, in this case the DPM remains in an unevenly distributed state due to the interruption in the complete regeneration processing before the previous balance point regeneration processing. As a result, the residual DPM amount in the filter 41 cannot be calculated on the basis of the pressure loss ΔP.

Hence at this time the process advances to steps S30, S31, where the residual DPM amount is calculated using a method other than one that is based on the pressure loss ΔP. More specifically, in the step S30 the residual DPM amount PMr is calculated on the basis of the regeneration speed of the DPM trapped in the filter 41. For example, the DPM regeneration speed is determined from the exhaust gas flow Qexh and the exhaust gas temperature Texh (=the filter inlet temperature T1) by referring to a map having a content such as that shown in FIG. 9, and the resulting value is multiplied by the regeneration processing period (timer value TM) up to the interruption in the regeneration processing. In other words, the amount of regenerated DPM PMr up to the interruption in the regeneration processing is calculated according to the above equation (3).

In the step S31, the residual DPM amount PMβ is calculated by subtracting the regenerated DPM amount PMr up to the interruption in the regeneration processing from the trapped DPM amount PMα (calculated in the step S3 or the steps S4, S5 in FIG. 5A).

In this case, balance point regeneration processing is performed, and hence the regenerated DPM amount PMr calculated in the step S30 is substantially zero. Accordingly, the residual DPM amount PMβ calculated in the step S31 is substantially identical to the trapped DPM amount PMα at the beginning of balance point regeneration processing. Even so, by performing the operations of the steps S28–S31 to calculate the residual DPM amount, the calculation precision of the residual DPM amount can be raised.

In a step S32, regeneration processing following interrupted regeneration processing is performed. Regeneration processing is divided into three types according to the operating condition at that time. If the operating condition shifts to the complete regeneration region directly after an interruption in balance point regeneration processing, the process advances to the step S8 in FIG. 5B in order to perform complete regeneration processing. If the operating condition returns to the balance point regeneration region directly after an interruption in balance point regeneration processing, the process advances to the step S21 in FIG. 5B to repeat balance point regeneration processing. If the operating condition remains in the regeneration impossible region directly after an interruption in balance point regeneration processing, the process advances to the step S2 in FIG. 5A in order to perform normal running processing.

Thus balance point regeneration processing is substantially identical to complete regeneration processing. In balance point regeneration processing, however, there is no step corresponding to the step S19 during complete regeneration processing. In other words, when balance point regeneration processing is interrupted, the interruption flag F is not set to "1". The reason for this is as follows. It is known that uneven distribution of the DPM inside the filter 41 following an interruption in complete regeneration processing is due to a large temperature difference between the axial center and the outer periphery of the filter 41. During balance point regeneration processing, however, the DPM trapped in the filter 41 does not burn vigorously, and hence there is no great temperature difference between the axial center and outer periphery of the filter 41. Accordingly, uneven distribution of the DPM inside the filter 41 does not occur. Thus the reason for not setting the interruption flag F to "1" following an interruption in balance point regeneration processing is that uneven distribution of the DPM inside the filter 41 does not occur as a result of the interruption.

Effects of this embodiment will now be described.

When the previous regeneration processing of the filter 41 is complete regeneration processing and the operating condition shifts to the regeneration impossible region following the beginning of the previous complete regeneration processing such that the previous complete regeneration processing is interrupted, uneven distribution of the DPM inside the filter 41 occurs. If the trapped DPM amount PMα in the filter 41 is calculated (estimated) on the basis of the pressure loss ΔP of the filter 41, which is detected by the sensor 36, during normal running following the interruption in the previous complete regeneration processing, the trapped DPM amount is estimated to be lower than the actual amount, and thus determination of the regeneration timing is delayed. As a result, regeneration processing is performed after the trapped DPM amount has exceeded its critical mass, causing the filter temperature to rise beyond the maximum allowable temperature during the current complete regeneration processing, and leading to possible damage to the durability of the filter 41.

In this embodiment, the trapped DPM amount in the filter 41 is calculated (estimated) on the basis of the discharged DPM amount rather than the pressure loss ΔP in the filter 41 (the steps S2, S4, S5 in FIG. 5A), and hence the calculation precision for the trapped DPM amount during normal running following an interruption in the previous complete regeneration processing is improved over a case in which the trapped DPM amount in the filter 41 is estimated on the basis of the pressure loss ΔP. As a result, determination of the regeneration timing of the filter 41 is not delayed, and the temperature of the filter 41 can be prevented from rising above the maximum allowable temperature.

Meanwhile, when the trapped DPM amount PMα in the filter is calculated on the basis of the discharged DPM amount during normal running, the regeneration timing of the filter 41 is determined on the basis of the calculated trapped DPM amount PMα, and the previous complete regeneration processing of the filter 41 ends without interruption (the step S6 in FIG. 5A, and the steps S7–S13 in FIG. 5B), the determination during the following normal running as to whether the regeneration timing has been reached is made on the basis of pressure loss ΔP of the filter 41 detected by the sensor 36 (the steps S2, S3, S6 in FIG. 5A). According to the method of calculating the trapped DPM amount on the basis of the pressure loss ΔP, the back pressure of the engine can be securely prevented from exceeding a fixed pressure.

Hence according to this embodiment, the temperature of the filter can be prevented from exceeding the maximum allowable temperature during current complete regeneration processing even when the DPM inside the filter 41 is distributed unevenly due to an interruption in the previous complete regeneration processing of the filter 41, and simultaneously the back pressure of the engine can be securely prevented from exceeding a fixed pressure. As a result, the durability of the filter 41 can be improved.

Also according to this embodiment, when the operating condition shifts from the complete regeneration region to the balance point regeneration region such that complete regeneration processing cannot be performed, balance point regeneration processing is performed to prevent DPM from quickly becoming trapped in the filter 41 up to a critical mass.

When complete regeneration processing is interrupted, DPM is distributed through the filter 41 unevenly due to a large distribution of temperature difference within the filter 41, but when balance point regeneration processing is interrupted, the temperature difference within the filter 41 is small and the DPM is not distributed unevenly through the filter 41. Hence if the interruption flag F is set at "1" (information indicating that regeneration processing of the filter 41 has been interrupted is stored) when balance point regeneration processing is interrupted, similarly to when complete regeneration processing is interrupted, the regeneration timing cannot be determined during the following normal running from the pressure loss ΔP of the filter detected by the sensor 36 even though in actuality the DPM is not distributed unevenly. According to this embodiment, however, the interruption flag F is not set to "1" (information indicating that regeneration processing of the filter 41 has been interrupted is not stored) when balance point regeneration processing is interrupted (the steps S27–S32 in FIG. 5B), and hence the regeneration timing can be determined during normal running following an interruption in balance point regeneration processing from the pressure loss ΔP of the filter 41 detected by the sensor 36 (the steps S2, S3 in FIG. 5A), as a result of which the back pressure of the engine can be securely prevented from equaling or exceeding a fixed pressure.

Further, according to this embodiment, when the previous regeneration processing of the filter 41 is balance point regeneration processing, a determination is made as to whether the regeneration processing before that was complete regeneration processing, and when it is determined from the determination result that the regeneration processing before the previous regeneration processing was complete regeneration processing, a determination is made from the value of the interruption flag F (the information of the information storage means) as to whether the complete regeneration processing before the previous regeneration processing was interrupted or completed without interruption. If it is determined from the determination result that the complete regeneration processing before the previous regeneration processing was completed without interruption, the trapped DPM amount in the filter 41 is calculated (estimated) during normal running following the previous balance point regeneration processing on the basis of the pressure loss ΔP of the filter detected by the sensor 36, whereas if it is determined that the complete regeneration processing before the previous regeneration processing was interrupted, the trapped DPM amount in the filter 41 is calculated (estimated) during normal running following the previous balance point regeneration processing on the basis of the discharged DPM amount. Hence the trapped DPM amount can be calculated with good precision even during normal running following the previous balance point regeneration processing.

It should be noted that in this embodiment, filter regeneration processing is described as comprising complete regeneration processing and balance point regeneration processing, but balance point regeneration processing need not be provided.

The entire contents of Japanese Patent Application P2003-99207 (filed Apr. 2, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An exhaust gas processing device of a diesel engine, comprising:
    a filter provided in an exhaust passage of the engine, which traps diesel particulate matter (DPM) in the exhaust gas; and
    a controller configured to:
    determine whether, during previous regeneration processing of the filter, the previous regeneration processing was interrupted or whether the previous regeneration processing was completed without interruption; and
    estimate a trapped DPM amount in the filter on the basis of a pressure loss in the filter during running following uninterrupted completion of the previous regeneration processing in the previous regeneration processing of the filter, and estimate the trapped DPM amount in the filter on the basis of a discharged DPM amount during running following an interruption in the previous regeneration processing in the course of the previous regeneration processing of the filter.

2. The exhaust gas processing device as defined in claim 1, wherein the controller is further configured to:
    determine whether a regeneration timing for the filter has been reached on the basis of the estimated trapped DPM amount; and
    perform regeneration processing of the filter when it is determined that the regeneration timing of the filter has been reached.

3. The exhaust gas processing device as defined in claim 2, wherein the controller is further configured to perform complete regeneration processing, which is regeneration processing in which the DPM trapped in the filter is burned completely.

4. The exhaust gas processing device as defined in claim 2, wherein the filter regeneration processing performed by the controller includes:
   complete regeneration processing in which the DPM trapped in the filter is burned completely; and
   balance point regeneration processing in which the amount of DPM flowing into the filter 41 and the amount of DPM that is burned in the filter 41 are balanced such that the trapped DPM amount in the filter is maintained at a constant level.

5. The exhaust gas processing device as defined in claim 4, wherein the controller is further configured to:
   record information indicating that the regeneration processing of the filter has been interrupted and information indicating that the regeneration processing of the filter has been completed without interruption; and
   when determining from the recorded information whether the regeneration processing of the filter was interrupted or the regeneration processing of the filter was completed without interruption during the previous regeneration processing of the filter, refrain from recording the information indicating that the regeneration processing of the filter has been interrupted if balance point regeneration processing has been interrupted.

6. The exhaust gas processing device as defined in claim 5, wherein the controller is further configured to:
   determine whether or not regeneration processing before the previous regeneration processing was complete regeneration processing when the previous regeneration processing of the filter was balance point regeneration processing;
   when the regeneration processing before the previous regeneration processing was complete regeneration processing, determine from the recorded information whether the regeneration processing before the previous regeneration processing was interrupted or the complete regeneration processing before the previous regeneration processing was completed without interruption during the complete regeneration processing before the previous regeneration processing; and
   estimate the trapped DPM amount in the filter on the basis of the detected pressure loss in the filter during running following the previous balance point regeneration processing when the complete regeneration processing before the previous balance point regeneration processing was completed without interruption in the complete regeneration processing before the previous balance point regeneration processing, and estimate the trapped DPM amount in the filter on the basis of the discharged DPM amount during running following the previous balance point regeneration processing when the complete regeneration processing before the previous balance point regeneration processing was interrupted in the course of the complete regeneration processing before the previous balance point regeneration processing.

7. An exhaust gas processing method for a diesel engine comprising in an exhaust passage a filter which traps DPM in the exhaust gas, comprising:
   determining whether, during previous regeneration processing of the filter, the previous regeneration processing was interrupted or whether the previous regeneration processing was completed without interruption; and
   estimating a trapped DPM amount in the filter on the basis of a pressure loss in the filter during running following uninterrupted completion of the previous regeneration processing in the previous regeneration processing of the filter, and estimating the trapped DPM amount in the filter on the basis of a discharged DPM amount during running following an interruption in the previous regeneration processing in the course of the previous regeneration processing of the filter.

8. The method as defined in claim 7, further comprising:
   determining whether a regeneration timing of the filter has been reached on the basis of the estimated trapped DPM amount; and
   performing regeneration processing of the filter when it is determined that the regeneration timing of the filter has been reached.

9. An exhaust gas processing device of a diesel engine, comprising:
   a filter provided in an exhaust passage of the engine, which traps diesel particulate matter (DPM) in the exhaust gas;
   means for determining whether, during previous regeneration processing of the filter, the previous regeneration processing was interrupted or whether the previous regeneration processing was completed without interruption; and
   means for estimating a trapped DPM amount in the filter on the basis of a pressure loss in the filter during running following uninterrupted completion of the previous regeneration processing in the previous regeneration processing of the filter, and estimating the trapped DPM amount in the filter on the basis of a discharged DPM amount during running following an interruption in the previous regeneration processing in the course of the previous regeneration processing of the filter.

* * * * *